United States Patent
Bae et al.

(10) Patent No.: US 8,441,944 B2
(45) Date of Patent: May 14, 2013

(54) METHOD AND SYSTEM FOR PROVIDING MULTIMEDIA PORTAL CONTENTS IN A COMMUNICATION SYSTEM

(75) Inventors: Su-Jin Bae, Suwon-si (KR); Young-Ky Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1954 days.

(21) Appl. No.: 11/594,482

(22) Filed: Nov. 7, 2006

(65) Prior Publication Data

US 2007/0127642 A1    Jun. 7, 2007

(30) Foreign Application Priority Data

Nov. 7, 2005   (KR) .................. 10-2005-0106176

(51) Int. Cl.
   *H04L 12/56*   (2006.01)
   *H04J 1/16*    (2006.01)

(52) U.S. Cl.
   USPC ........... 370/252; 370/329; 370/401; 370/463; 709/203

(58) Field of Classification Search .................. 379/251, 379/88.13, 201.01, 82, 207.16, 257, 373.01, 379/373.02; 370/252, 401, 329, 463; 709/203
   See application file for complete search history.

(56) References Cited

U.S. PATENT DOCUMENTS

| | | | |
|---|---|---|---|
| 2004/0264961 A1* | 12/2004 | Nam et al. | 398/58 |
| 2006/0013376 A1* | 1/2006 | Kim et al. | 379/207.16 |
| 2006/0023862 A1* | 2/2006 | Sutcliffe | 379/257 |
| 2006/0073795 A1* | 4/2006 | Mayblum et al. | 455/90.2 |
| 2007/0019595 A1* | 1/2007 | Huh et al. | 370/338 |
| 2007/0190983 A1* | 8/2007 | Goldfarb et al. | 455/414.1 |
| 2008/0002824 A1* | 1/2008 | No et al. | 379/418 |

FOREIGN PATENT DOCUMENTS

| | | |
|---|---|---|
| KR | 1020040095838 | 11/2004 |
| KR | 1020050031477 | 4/2005 |
| KR | 1020050050182 | 5/2005 |
| KR | 1020050093518 | 9/2005 |

* cited by examiner

*Primary Examiner* — John Pezzlo
(74) *Attorney, Agent, or Firm* — The Farrell Law Firm, P.C.

(57) ABSTRACT

A system and method provide calling and called terminals with multimedia alerting signals such as a ringtone and ringback tone. When desiring to receive first multimedia portal contents as a multimedia alerting signal, the calling terminal presets the first multimedia portal contents and makes a call connection setup request. When desiring to provide second multimedia portal contents as a ringback tone, a called terminal presets the second multimedia portal contents and notifies that the ringtone and ringback tone are set. A Personal Internet Protocol Multimedia Subsystem (IMS) Portal (PIP) server receives call connection setup-related signals from the calling and called terminals, decides to provide particular multimedia portal contents as the ringback tone according to a predefined priority decision criterion when the calling and called terminals set the multimedia portal contents, and provides the set multimedia portal contents.

42 Claims, 5 Drawing Sheets

METHOD AND SYSTEM FOR PROVIDING MULTIMEDIA PORTAL CONTENTS IN A COMMUNICATION SYSTEM

PRIORITY

This application claims priority under 35 U.S.C. §119 to an application filed in the Korean Intellectual Property Office on Nov. 7, 2005 and assigned Serial No. 2005-106176, the contents of which are incorporated herein by reference.

BACKGROUND OF THE INVENTION

1. Field of the Invention

The present invention relates generally to a system and method for providing alerting contents in a communication system, and more particularly to a system and method for providing multimedia portal contents.

2. Description of the Related Art

An Internet Protocol (IP) Multimedia Subsystem (IMS) provides a packet communication service based on IP. The IMS is based on a Session Initiation Protocol (SIP) serving as an application layer control protocol based on text. The SIP is based on a client/server structure in which a server responds to a call from a client and allows one or more participants to create, modify and end sessions. The sessions include, for example, a remote conference, telephone conversation, interview, event notification and Instant Messaging (IM) using the Internet.

In a multimedia telephony environment based on the SIP, a "180 ringing" message is used to provide a calling terminal with a ringback tone. When receiving the "180 ringing" message, the calling terminal generates a ringback tone, reproduces ringback tone data conveyed on the ringing message, and provides a user with the ringback tone.

In the multimedia telephony environment based on the SIP, an INVITE message is used to provide a called terminal with a bell. When receiving the INVITE message, the called terminal generates a previously stored bell or provides a terminal user with a bell by reproducing ringback tone data contained in the INVITE message.

In communication systems such as a conventional Public Switched Telephone Network (PSTN), Code Division Multiple Access (CDMA) system and Wideband Code Division Multiple Access (W-CDMA) system, the calling terminal receives only a basic ringback tone or a ringback tone preset by a calling/called party when making a call request. The called terminal also receives only a bell in the form of pre-stored audio.

That is, in the conventional communication systems, the calling and called terminals receive bells or ringback tones regardless of intentions and preferences of their users, because resources for terminal performance and multimedia alerting are limited. The current communication systems are evolving from $3^{rd}$ generation to $4^{th}$ generation communications systems. Accordingly, high performance terminals are being developed, and service levels desired by users are increasing.

SUMMARY OF THE INVENTION

Accordingly, the present invention has been designed to solve the above and other problems occurring in the prior art. It is, therefore, an object of the present invention to provide a system and method for providing a called terminal with multimedia portal contents in a communication system.

It is another object of the present invention to provide a system and method for providing a calling terminal with multimedia portal contents in a communication system.

In accordance with the present invention, there is provided a system for providing a calling terminal with a ringback tone, including a calling terminal for presetting first multimedia portal contents when desiring to receive the first multimedia portal contents as a ringback tone and making a call connection setup request; a called terminal for presetting second multimedia portal contents when desiring to provide the second multimedia portal contents as the ringback tone and notifying that the ringback tone is set, and a first server for receiving call connection setup-related signals from the calling and called terminals, deciding to provide particular multimedia portal contents as the ringback tone according to a predefined priority decision criterion when the calling and called terminals set the multimedia portal contents, and providing the set multimedia portal contents.

In accordance with the present invention, there is provided a system for providing a called terminal with a ringtone, including a calling terminal for presetting first multimedia portal contents when desiring to provide the first multimedia portal contents as a ringtone, and making a call connection setup request, a called terminal for presetting second multimedia portal contents to the ringtone to receive the second multimedia portal contents as the ringtone and reproducing the first or second multimedia portal contents as the ringtone according to a predefined priority decision criterion whenever the call connection setup request is received, and a first server for providing the calling and called terminals with the first or second multimedia portal contents.

In accordance with the present invention, there is provided a method for providing a calling terminal with a ringback tone in a communication system, including presetting first multimedia portal contents when a calling terminal desires to receive the first multimedia portal contents as its own ringback tone, and making a call connection setup request, presetting second multimedia portal contents when a called terminal desires to provide the second multimedia portal contents as the ringback tone and notifying that the ringback tone is set, receiving, by a first server, call connection setup-related signals from the calling and called terminals, deciding to provide particular multimedia portal contents as the ringback tone according to a predefined priority decision criterion when the calling and called terminals set the multimedia portal contents, and providing the set multimedia portal contents as the ringback tone to the calling terminal.

In accordance with the present invention, there is provided a method for providing a called terminal with a ringtone in a communication system, including presetting first multimedia portal contents when a calling terminal desires to provide the first multimedia portal contents as a ringtone, and making a call connection setup request, presetting, by a called terminal, second multimedia portal contents to the ringtone to receive the second multimedia portal contents as the ringtone, and receiving and reproducing the first or second multimedia portal contents as the ringtone from a particular server according to a predefined priority decision criterion whenever the call connection setup request is received.

BRIEF DESCRIPTION OF THE DRAWINGS

The above and other features and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the accompanying drawings. In the following description, detailed descriptions of functions and configurations incorporated herein that are well known to those skilled in the art are omitted for the sake of clarity and conciseness.

The present invention proposes a system and method for providing interactive or two-way multimedia portal contents in a communication system using an Internet Protocol (IP) Multimedia Subsystem (IMS).

In the present invention, when a calling terminal sends a call request to a called terminal, a called terminal side transmits an alerting signal including multimedia portal contents or information needed to use them. When receiving the alerting signal, the calling terminal can detect desired information by reproducing the associated multimedia portal contents. Further, the calling terminal can receive differentiated services by running various service clients.

Figure 1:
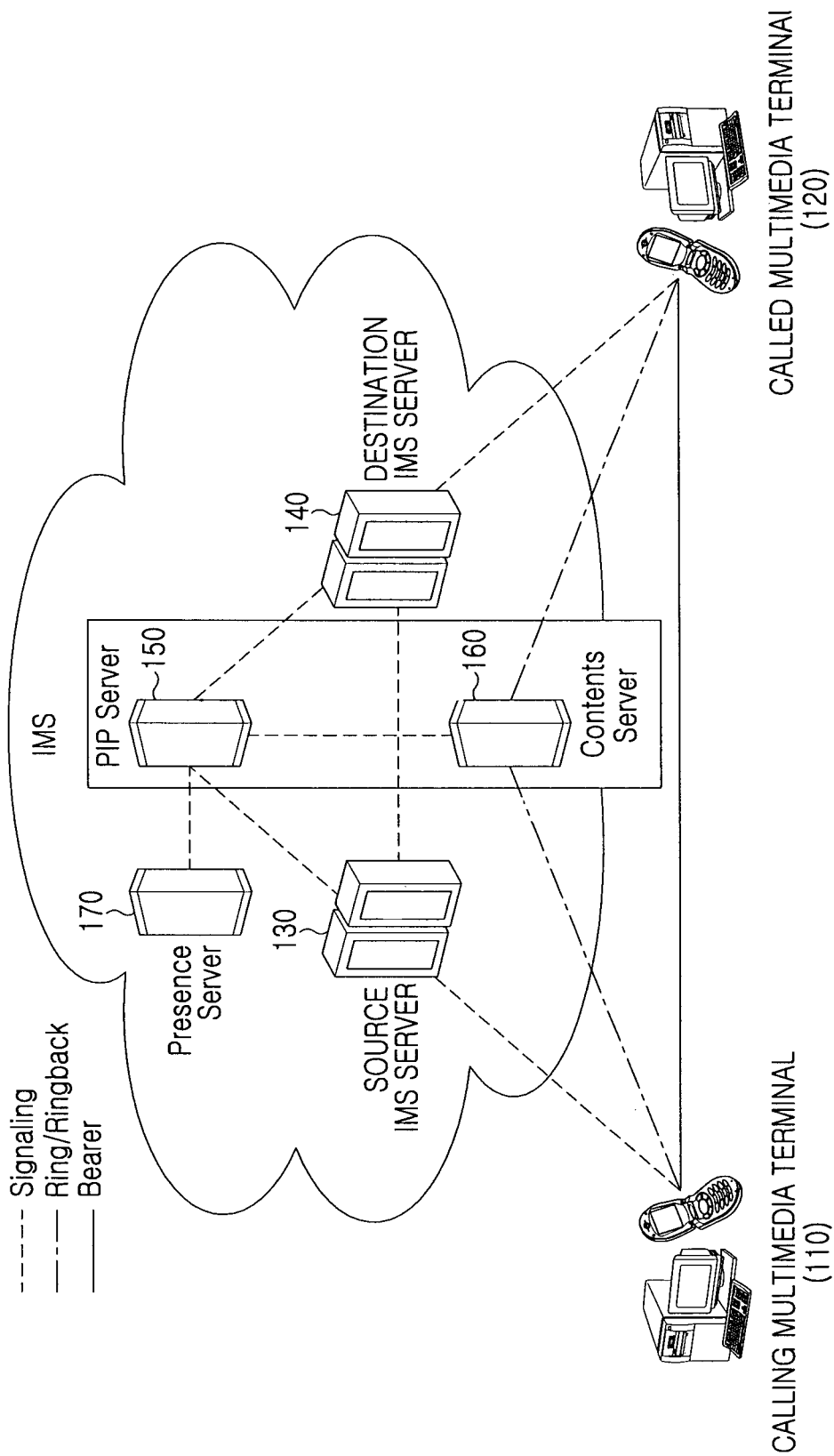
FIG. 1 illustrates a communication system structure for providing multimedia portal contents in accordance with the present invention.

FIG. 1 illustrates a communication system structure for providing multimedia portal contents in accordance with the present invention.

Referring to FIG. 1, the communication system includes a calling terminal 110 and a called terminal 120 with a multimedia function, a source IMS server 130 and a destination IMS server 140 for processing the associated sessions between the calling terminal 110 and the called terminal 120, a Personal IMS Portal Application (PIP) server 150 for providing the calling terminal 110 and the called terminal 120 with multimedia portal contents, and a contents server 160 for maintaining/managing content resources. A presence server 170 is an additional server for maintaining/managing presence information of the associated user when the present invention is implemented in an actual communication environment. The present invention can interwork with an Instant Messaging (IM) server, a Data Manipulation Server (DMS) and a Location Based Server (LBS) as well as the presence server.

The calling terminal 110 and the called terminal 120 can be a wired terminal, a wireless terminal or an integrated wired/wireless terminal, respectively, and should have sufficient processing power for reproducing multimedia portal contents. Further, the calling terminal 110 and the called terminal 120 should have a function for recording/reproducing voice and multimedia. Particular multimedia can be transmitted and received using a header of a Session Initiation Protocol (SIP) message.

The source IMS server 130 and the destination IMS server 140 are responsible for setting up and releasing a call connection between the calling terminal 110 and the called terminal 120. Further, when a particular alerting signal to the calling and called terminals is required according to service profile of an associated terminal user, the source IMS server 130 and the destination IMS server 140 process service by interworking with the PIP server 150.

The PIP server 150 provides the calling terminal 110 and the called terminal 120 with multimedia portal contents. That is, the PIP server 150 performs a function for providing the calling terminal 110 and the called terminal 120 with the multimedia portal contents in response to requests of the IMS servers 130 and 140.

The contents server 160 maintains/manages multimedia portal contents constructed with HyperText Transfer Protocol (HTTP), Wireless Application Protocol (WAP), flash animations, as well as audio, video, images and messages. The contents server 160 can be integrated with the PIP server 150.

In the present invention, two schemes for providing multimedia portal contents are considered.

In the first scheme, a calling terminal user provides his/her calling terminal with preset multimedia portal contents as a ringback tone. That is, the calling terminal user presets multimedia portal contents according to his/her intention and provides his/her calling terminal with the ringback tone when a call is sent. In an example of implementing this service, a caller receives the ringback tone in the form of preset web information, for example, particular stock information, whenever a call attempt is made.

In the second scheme, the called terminal user provides the calling terminal with preset multimedia portal contents as a ringback tone. That is, the calling terminal can receive the preset multimedia portal contents according to intention of the called terminal user. In an example of implementing this service, if the called terminal is related to a particular company, the calling terminal can receive multimedia portal contents on a website home page of the particular company whenever sending a call request to the called terminal. Using the received multimedia portal contents, the calling terminal can additionally receive various services.

In the first and second schemes, the use of the associated multimedia portal contents should be decided according to predefined priority decision policy when both the calling terminal and the called terminal set arbitrary multimedia portal contents to the ringback tones. The priority can be set according to importance of the multimedia portal contents to be provided. The multimedia portal contents set by either the calling user or called user can be set to have a higher priority. This priority can be set and changed by a system operator.

Herein, the ringback tone is provided to the calling terminal when the calling terminal sends a call request to the called terminal, whereas the bell is provided to the called terminal when the calling terminal sends a call request to the called terminal. In the present invention, an example in which the ringback tone is provided in the form of multimedia portal contents has been described. Also, the bell can be provided in the form of multimedia portal contents. That is, when the calling terminal makes a call request, the called terminal can receive the bell in the form of multimedia portal contents provided by the calling user. Of course, the called terminal can preset multimedia portal contents and can receive the preset multimedia portal contents as the bell whenever the call request is made.

The multimedia portal contents can be implemented with, for example, a website home page for advertising an individual or company, web information for on-line shopping, a phone number search page (including a click-to-dial function), personal name card flash and a graphic file of an image and a map. As described above, the multimedia portal contents can be provided from the PIP server or from the contents server interworking with the PIP server.

Next, a concrete example of actual use of multimedia portal contents will be described.

(1) Web Page for On-line Shopping

Information of local restaurants (e.g., Chinese restaurants, pizza restaurants and markets) is provided in the form of a web page or flash animation.

Product image and price information

Order selection button and a window for input the number of products

Call button for a phone call (or order)

Advance purchase of movie/play tickets

Use of a reservation code (or barcode) downloaded to a terminal after the advance purchase Transmission of a gift message and a reservation code through an instant message from one terminal to another after the advance purchase (2) Mini-web Page Connection to a company network using a company number Mini-homepage for advertising a company Phone number guidance (or click-to-dial function)

(3) Phone Number Search

Provision of a phone number search page (or click-to-dial function)

Phone number storage (or phonebook function)

(4) Provision of Differentiated Contents Such as User Profile Information (e.g., Sex, Age, Address and Marital Status) and Current Location Information Related to Users (5) On-line Vote Popular vote of a broadcasting station Real-time vote result search function (interworking with a particular database)

Figure 2:
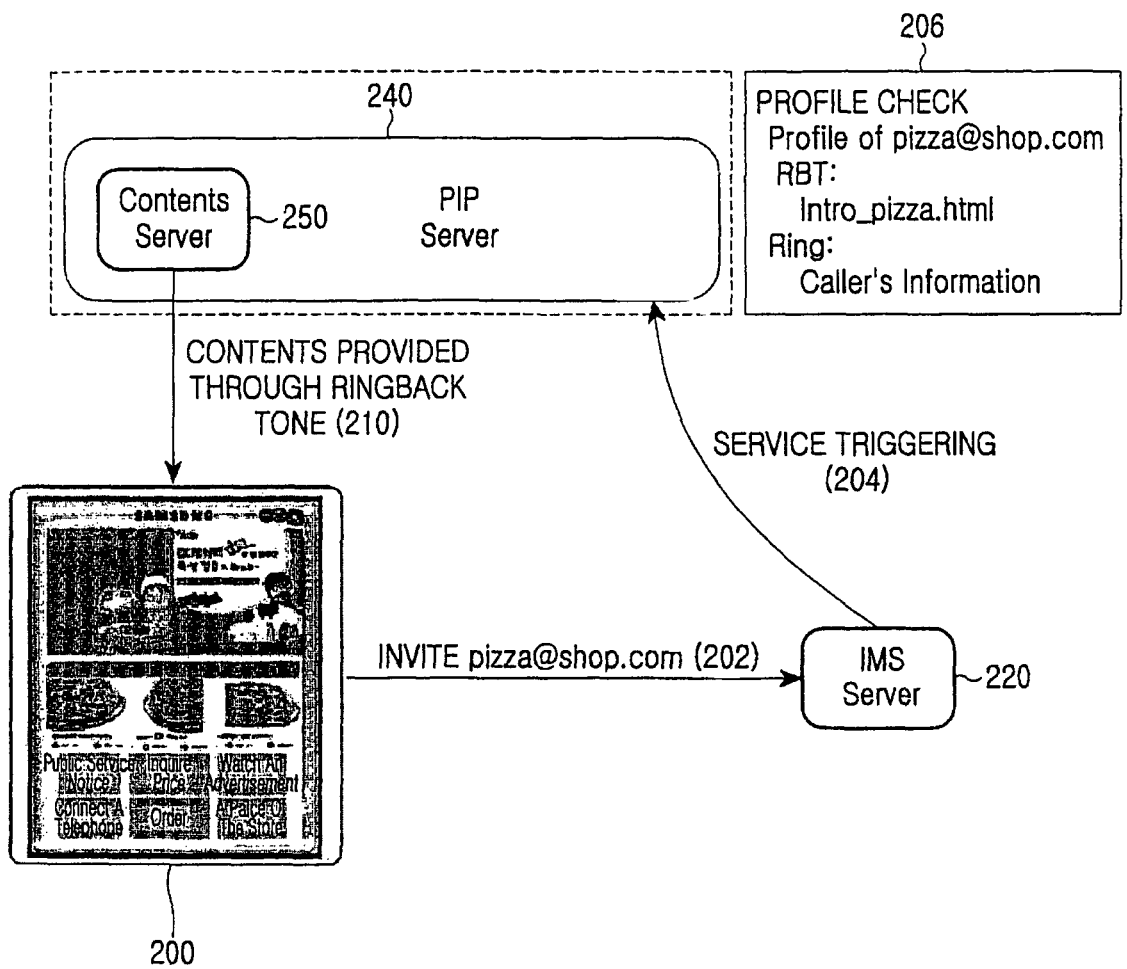
FIG. 2 illustrates an example of a scenario for receiving multimedia portal contents in accordance with the present invention.

FIG. 2 illustrates an example of a scenario for receiving multimedia portal contents in accordance with the present invention.

Referring to FIG. 2, a calling terminal 200 sends an INVITE message for sending a call request destined for a particular called terminal to a source IMS server 220 (step 202). It is assumed that the called terminal is a terminal of a pizza delivery business. Address information (e.g., pizza@shop.com) of the pizza business can be contained in a header of the INVITE message. That is, the header of the INVITE message can contain "Alert-Info: <pizza@shop.com>".

The destination IMS server 220 performs service triggering to a PIP server 240 (step 204). The service triggering is an operation for determining which service is to be provided from the IMS server to the called terminal when a call setup request of the called terminal is made and sending a service request to an application server, i.e., the PIP server 240, for providing the associated service.

The PIP server 240 checks a profile of the associated called terminal and provides the calling terminal 200 with the associated ringback tone when the ringback tone provided by the called terminal is present (step 210). Herein, the PIP server 240 can be implemented to interwork with a contents server 250 for providing multimedia portal contents. The PIP server 240 selects an initial access address (e.g., intro_pizza.html) of the pizza business as the ringback tone to be provided to the calling terminal 200. The calling terminal 200 displays the ringback tone provided from the PIP server 240, i.e., a website home page of the associated pizza business, and receives various information about types and prices of pizzas, in order for an on-line transaction service such as a pizza order to be provided.

Various methods such as the following two methods can be implemented for providing multimedia portal contents:

(1) A calling terminal receives a ringback tone including a Uniform Resource Locator (URL) of the associated multimedia portal contents and downloads and executes the multimedia portal contents from the associated URL.

(2) The calling terminal receives a ringback tone including information for a real-time connection with a server for providing multimedia portal contents, makes the real-time connection with the server using the associated information, and executes the multimedia portal contents.

Figure 3:
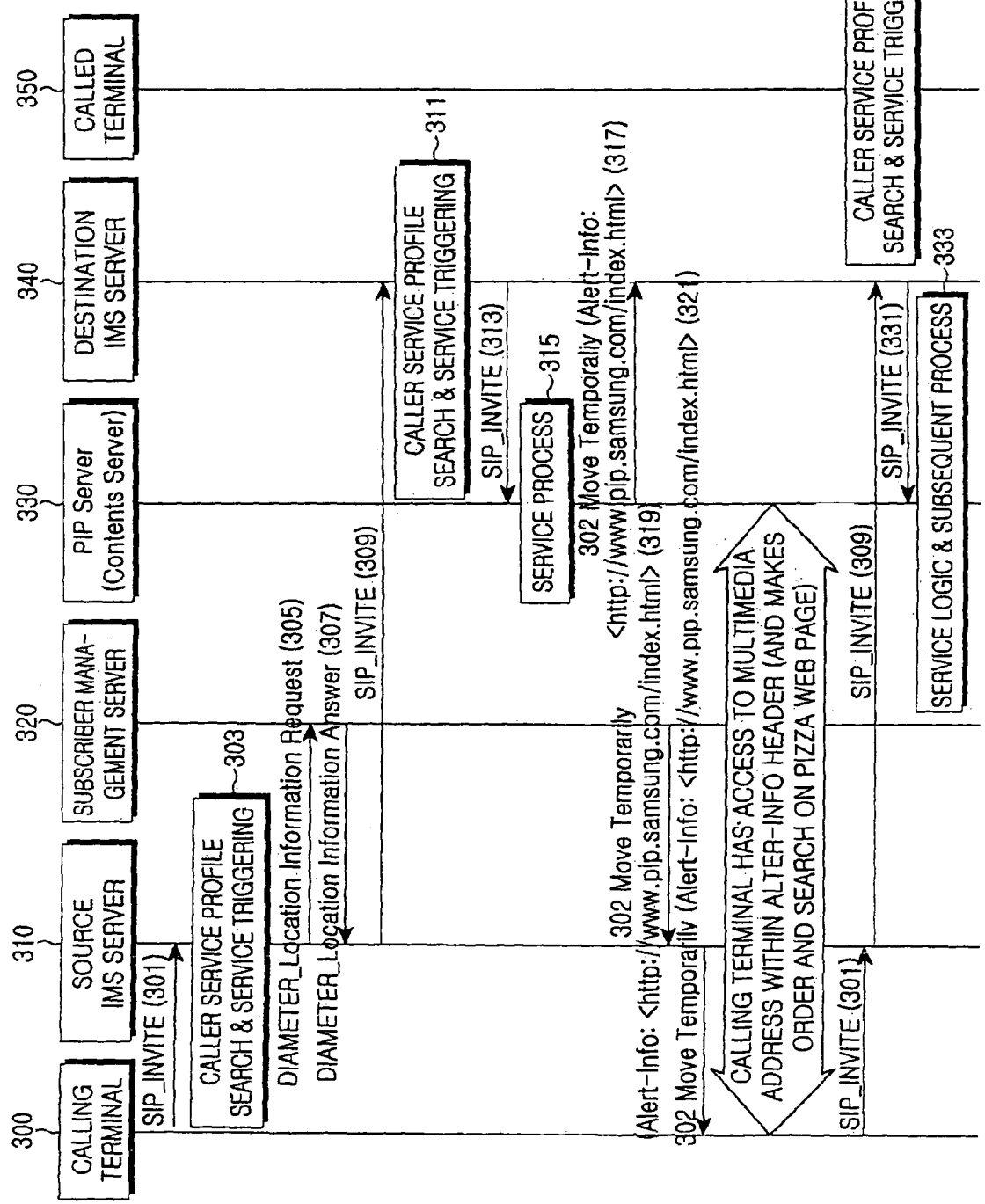
FIG. 3 is a signal flow diagram illustrating a process for receiving multimedia portal contents in accordance with the present invention.

FIG. 3 is a signal flow diagram illustrating a process for receiving multimedia portal contents in accordance with the present invention.

Referring to FIG. 3, a calling terminal 300 sends an SIP_INVITE message to a source IMS server 310 for call connection setup (step 301). The SIP_INVITE message can contain the following information.

INVITE sip:someone@samsung.com SIP/2.0
Via: SIP/2.0/UDP example.com; branch=z9hG4bKffe209934aac
To: sip:someone@samsung.com
From: <sip:person@samsung.com>;tag=2909034023
Call-ID: fe9023940-a3465

The source IMS server 310 retrieves a stored service profile of a calling terminal user and performs service triggering (step 303). Then, the source IMS server 310 sends a query to a subscriber management server 320 using a DIAMETER_Location Information Request message in order to find location of a called terminal 350 (step 305) and receives a DIAMETER_Location Information Answer message (step 307). The source IMS server 310 sends an SIP_INVITE message to a destination IMS server 340 mapped to an address of the called terminal 350 (step 309).

The destination IMS server 340 retrieves a stored service profile of a called terminal user and performs service triggering (step 311). The destination IMS server 340 sends the SIP_INVITE message to a PIP server 330 when an incoming call-related service is present in a service profile retrieval result (step 313).

When the called terminal 350 has been subscribed for a ringback tone service, the PIP server 330 checks ringback tone information (e.g., a web page or flash animation) to be provided to the calling terminal 300 and executes a service process for constructing multimedia portal contents to be provided to the calling terminal 300 (step 315). The PIP server 330 sends an SIP message containing information about multimedia portal contents to the destination IMS server 340 (step 317). An example of the SIP message is as follows.

SIP/2.0 302 Moved Temporarily
Via: SIP/2.0/UDP cscf.samsung.com; branch=z9hG4bKe89_2.0
From: sip:UE1@samsung.com; tag=123sd
Call-ID: 1234
CSeq: 321 INVITE
Contact: <sip:UE2@samsung.com; service=pip>; expires=30; auto-retry=5
Alert-Info: http://www.pip.samsung.com/index.html
Description: A message is sent in which an address of the associated multimedia portal contents is designated in an Alert-Info header. When receiving the message, a terminal downloads and reproduces multimedia portal contents through HTTP.

Content-length: 0

When receiving the SIP message, the destination IMS server 340 sends the SIP message to the source IMS server 310 (step 319). The source IMS server 310 sends the SIP message to the calling terminal 300 (step 321).

The calling terminal 300 has access to the address of the multimedia portal contents contained in the Alert-Info header of the received SIP message and downloads and reproduces the multimedia portal contents or reproduces the multimedia portal contents in real time. At this time, the calling terminal 300 can use an interactive or two-way service such as a product order, a price search and a location search, through a display window of the associated multimedia portal contents. The multimedia portal contents can be provided in the form of buttons (e.g., a call button, a message send button and a Push To All (PTA) service button for enabling communication with multiple users) for interworking with other services as well as a basic web page. For example, when a calling terminal user presses the call button in a state in which a particular web page is displayed, the calling terminal 300 sends a call request through the associated web page. Subsequent steps 325 to 333 are operations when the calling terminal 300 makes a service request and a detailed description is omitted herein.

In order to perform the operations as described with reference to FIG. 3, the terminals and the servers should perform or provide the following functions:

(1) Requirements of the calling and called terminals

Downloading multimedia portal contents contained in an SIP message and header from the associated server Reproducing multimedia portal contents received from the PIP server Interworking with other services in response to a pressed button in a search function through a web page (e.g., a message transmission function and a PTA transmission function)

(2) Requirements of the source and destination IMS servers

Setting up a session for a user of multimedia portal contents

Interworking with the PIP server according to user profile

Sending a message received from the PIP server to the associated terminal (3) Requirements of the PIP server (including the contents server)

Figure 4:
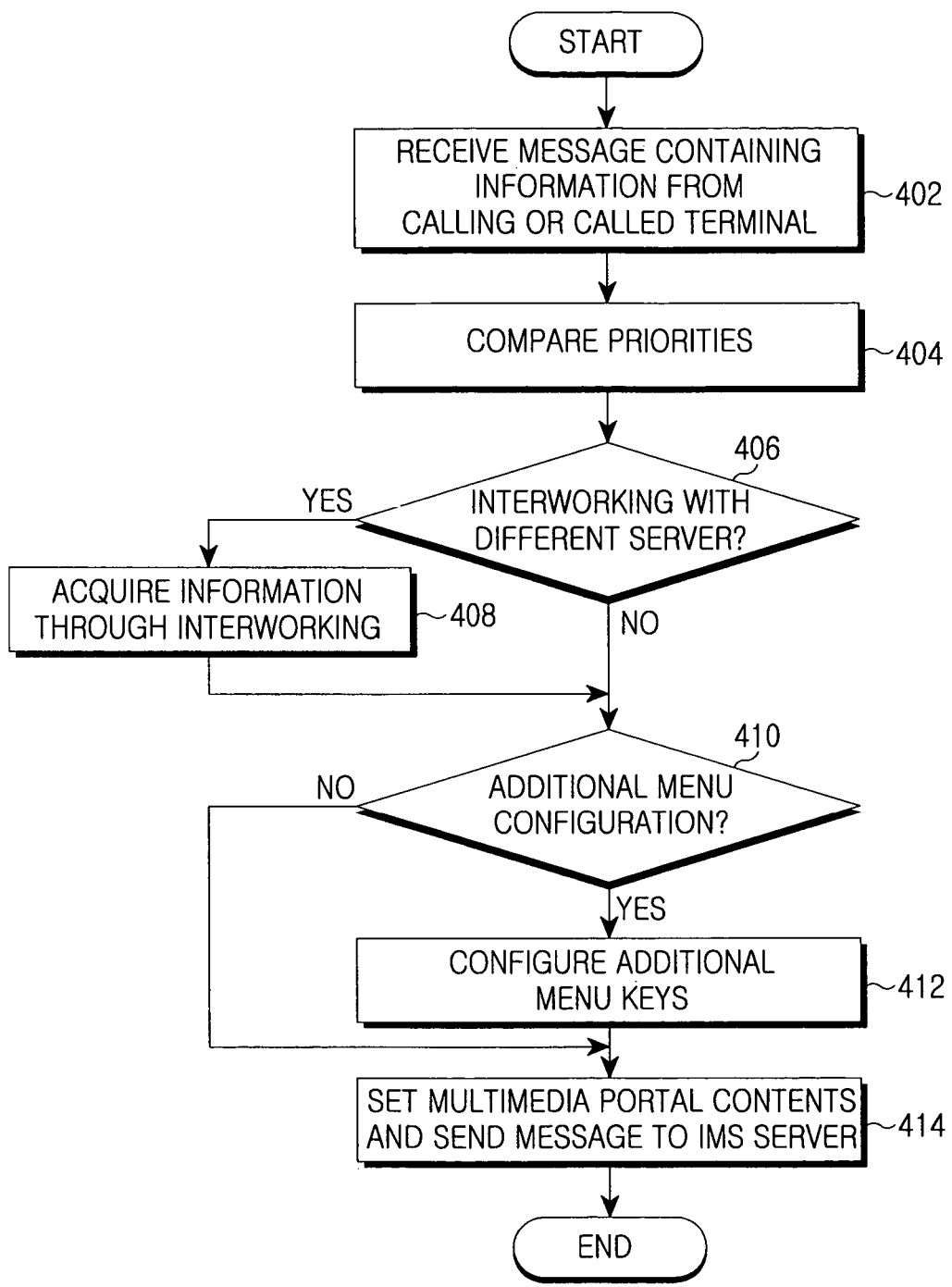
FIG. 4 is a flowchart illustrating an operation process of a Personal Internet Protocol (IP) Multimedia Subsystem (IMS) Portal (PIP) server for providing multimedia portal contents in accordance with the present invention.

Providing the IMS server or terminal with information about the associated multimedia portal contents according to user-by-user service profiles Setting multimedia portal contents to be provided from the web Setting multimedia portal contents to be provided from a user Providing the called terminal with a combination of various multimedia sources according to user profile Enabling a terminal to reject the associated multimedia portal contents Enabling a terminal to reject multimedia portal contents of a particular user FIG. 4 is a flowchart illustrating an operation process of the PIP server for providing multimedia portal contents in accordance with the present invention.

Referring to FIG. 4, the PIP server receives a message containing information about multimedia portal contents from a calling or called terminal in step 402 and then proceeds to step 404 where it compares priorities and then proceeds to step 406. At this time, a priority of the multimedia portal contents of the calling terminal is compared with that of the multimedia portal contents of the called terminal in order to determine which of the priorities is higher. The system can predefine the priorities and the PIP server can adaptively set the priorities.

If the multimedia portal contents preset by the calling terminal are present but the multimedia portal contents set by the called terminal are absent, the calling terminal makes a call request and then receives a ringback tone of the multimedia portal contents set thereby. However, if the multimedia portal contents preset by the called terminal are present but the multimedia portal contents set by the calling terminal are absent, the calling terminal makes a call request and then receives a ringback tone of the multimedia portal contents set by the called terminal.

In step 406, the PIP server determines whether interworking with a different server is required to construct multimedia portal contents. If multimedia portal contents set by the calling terminal are present and the multimedia portal contents set by the calling terminal have a higher priority than those set by the called terminal, the interworking with the different server is not required. However, if multimedia portal contents set by the calling terminal are absent or the multimedia portal contents set by the calling terminal have a lower priority than multimedia portal contents set by the called terminal even when the contents set by the calling terminal are present, the PIP server must perform an operation for determining whether the interworking with the different server is required. If the interworking with the different server is determined to be required, the PIP server proceeds to step 408. However, if the interworking with the different server is not required, the PIP server proceeds to step 410.

The PIP server acquires information for constructing the multimedia portal contents by performing the interworking with the different server in step 408 and then proceeds to step 410.

In step 410, the PIP server determines whether an additional menu configuration is required to construct the multimedia portal contents. If the additional menu configuration is required, the PIP server proceeds to step 412. However, if the additional menu configuration is not required, the PIP server proceeds to step 414.

The PIP server includes additional menu buttons such as a call button, a message button and a PTA button in the multimedia portal contents in step 412 and proceeds to step 414. In step 414, the PIP server constructs and sets the multimedia portal contents and provides the multimedia portal contents to the associated IMS server.

Figure 5:
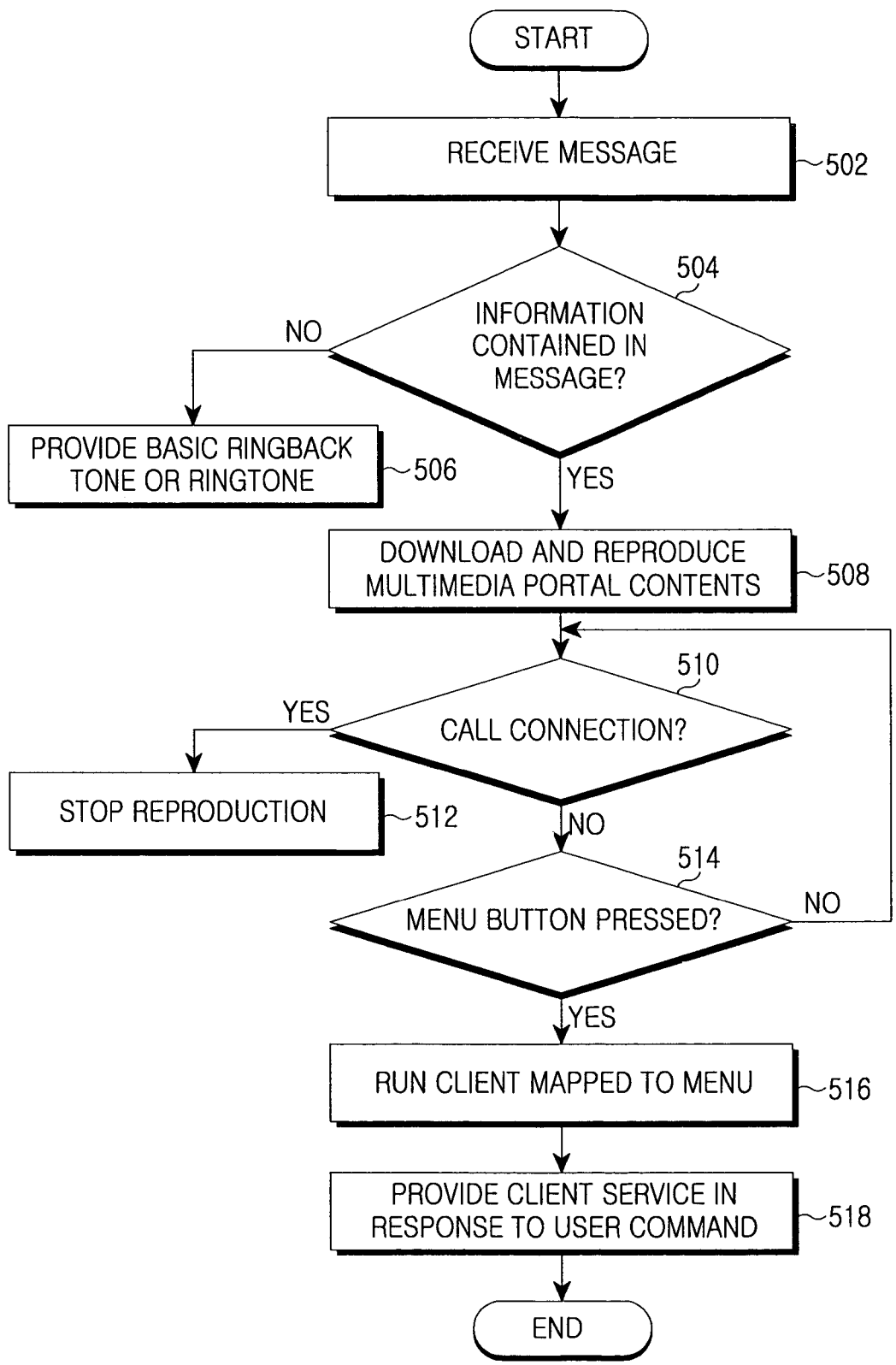
FIG. 5 is a flowchart illustrating an operation process of a terminal for receiving multimedia portal contents (of a ringtone and ringback tone) in accordance with the present invention.

FIG. 5 is a flowchart illustrating an operation process of a terminal for receiving multimedia portal contents (or a ringback tone) in accordance with the present invention.

Referring to FIG. 5, the terminal receives an INVITE message from the IMS server in step 502 and then proceeds to step 504. In step 504, the terminal determines whether the message contains multimedia portal contents and its information. If the multimedia portal contents are determined to be present, the terminal proceeds to step 508. However, if the multimedia portal contents are determined to be absent, the terminal proceeds to step 506.

In step 506, the terminal receives a basic ringback tone set by itself or by a system. The calling terminal downloads and reproduces the multimedia portal contents or reproduces the multimedia portal contents in real time in step 508 and then proceeds to step 510. In step 510, the terminal determines whether a call connection between the terminal and an opposite terminal is established. If the call connection is established, the terminal proceeds to step 512 to stop the reproduction of the multimedia portal contents and communicate with the opposite terminal. However, the reproduction of the multimedia portal contents is not always stopped although the call connection between the terminals is established. For example, multimedia portal contents currently being reproduced can be continuously maintained while the terminal performs communication using an earphone or speaker.

In step 514, the terminal determines whether the user presses a particular menu button. If the particular menu button is pressed, the terminal proceeds to step 516. Otherwise, the terminal returns to step 510 to wait for a call connection.

The terminal runs a service client mapped to the pressed menu button in step 516 and then proceeds to step 518. In step 518, the terminal receives the associated client service from the service client in response to a command signal input from the user. Herein, the client service is, for example, instant messaging, on-line transaction service, or the PTA service as described above.

As is apparent from the above description, the present invention can provide user terminals with a bell or ringback tone in the form of multimedia portal contents and can provide a variety of differentiated services on a terminal-by-terminal basis. Further, companies for the pursuit of profits can maximize advertising effect and can create various profit models, by providing multimedia portal contents using the bell or ringback tone. Since users can perform interactive or two-way multimedia communication, user convenience can be enhanced.

Although the preferred embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A system for providing a calling terminal with a ringback tone, comprising:
a calling terminal for presetting first multimedia portal contents when desiring to receive the first multimedia portal contents as a ringback tone and making a call connection setup request;
a called terminal for presetting second multimedia portal contents when desiring to provide the second multimedia portal contents as the ringback tone and notifying that the ringback tone is set; and
a first server for receiving call connection setup-related signals from the calling and called terminals, deciding to provide particular multimedia portal contents as the ringback tone according to a priority decision criterion when the calling and called terminals set the multimedia portal contents, and providing the set multimedia portal contents.

2. The system of claim 1, wherein the first server is a Personal Internet Protocol Multimedia Subsystem (IMS) Portal (PIP) server.

3. The system of claim 1, further comprising:
a second server, located on an intermediate path between the calling or called terminal and a PIP server, for setting up and releasing a call connection.

4. The system of claim 3, wherein the second server is an IMS server.

5. The system of claim 1, wherein the multimedia portal contents are implemented with at least one of an Internet web page, a still image, a motion image, a Wireless Application Protocol (WAP) and audio.

6. The system of claim 1, wherein the first server includes information about multimedia portal contents to be provided in a header and body of a Session Initiation Protocol (SIP) message.

7. The system of claim 1, wherein the priority decision criterion is that the first multimedia portal contents set by the calling terminal have a higher priority than the second multimedia portal contents set by the called terminal.

8. The system of claim 1, wherein the priority decision criterion is that the second multimedia portal contents set by the called terminal have a higher priority than the first multimedia portal contents set by the calling terminal.

9. The system of claim 1, wherein the first server configures an additional menu so that the calling terminal can perform an additional function using the multimedia portal contents when the multimedia portal contents to be provided to the calling terminal are constructed.

10. The system of claim 9, wherein the additional menu is a call menu for performing a call connection with a particular opposite terminal through the multimedia portal contents.

11. The system of claim 9, wherein the additional menu is a Push To All (PTA) menu for communicating with multiple terminals through the multimedia portal contents.

12. The system of claim 9, wherein the additional menu is for providing capability information in response to a query about capability of a terminal and a service of a terminal user.

13. The system of claim 1, wherein the calling terminal has a function for rejecting a reception of the multimedia portal contents set by the called terminal.

14. A method for providing a calling terminal with a ringback tone in a communication system, comprising the steps of:
presetting first multimedia portal contents when a calling terminal desires to receive the first multimedia portal contents as its own ringback tone, and making a call connection setup request;
presetting second multimedia portal contents when a called terminal desires to provide the second multimedia portal contents as the ringback tone and notifying that the ringback tone is set;
receiving, by a first server, call connection setup-related signals from the calling and called terminals;
deciding to provide particular multimedia portal contents as the ringback tone according to a priority decision criterion when the calling and called terminals set the multimedia portal contents; and
providing the set multimedia portal contents as the ringback tone to the calling terminal.

15. The method of claim 14, wherein the first server is a Personal Internet Protocol Multimedia Subsystem (IMS) Portal (PIP).

16. The method of claim 14, wherein the multimedia portal contents are implemented with at least one of an Internet web page, a still image, a motion image, a Wireless Application Protocol (WAP) and audio.

17. The method of claim 14, wherein information about multimedia portal contents to be provided comprises included in a header and body of a Session Initiation Protocol (SIP) message.

18. The method of claim 14, wherein the priority decision criterion is that the first multimedia portal contents set by the calling terminal have a higher priority than the second multimedia portal contents set by the called terminal.

19. The method of claim 14, wherein the priority decision criterion is that the second multimedia portal contents set by the called terminal have a higher priority than the first multimedia portal contents set by the calling terminal.

20. The method of claim 14, further comprising the step of:
configuring, by the first server, an additional menu so that the calling terminal can perform an additional function using the multimedia portal contents when the multimedia portal contents to be provided to the calling terminal are constructed.

21. The method of claim 20, wherein the additional menu is a call menu for performing a call connection with a particular opposite terminal through the multimedia portal contents.

22. The method of claim 20, wherein the additional menu is a Push To All (PTA) menu for communicating with multiple terminals through the multimedia portal contents.

23. The method of claim 20, wherein the additional menu is for providing capability information in response to a query about capability of a terminal and a service of a terminal user.

24. The method of claim 20, wherein the calling terminal has a function for rejecting a reception of the multimedia portal contents set by the called terminal.

25. A system for providing a called terminal with a ringtone, comprising:
a calling terminal for presetting first multimedia portal contents when desiring to provide the first multimedia portal contents as a bell, and making a call connection setup request;
a called terminal for presetting second multimedia portal contents to the bell to receive the second multimedia portal contents as the bell and reproducing the first or second multimedia portal contents as the bell according to a priority decision criterion whenever the call connection setup request is received; and
a first server for providing the calling and called terminals with the first or second multimedia portal contents.

26. The system of claim 25, wherein the first server is a Personal Internet Protocol Multimedia Subsystem (IMS) Portal (PIP) server.

27. The system of claim 25, further comprising:
a second server, located on an intermediate path between the calling or called terminal and the first server, for setting up and releasing a call connection.

28. The system of claim 27, wherein the second server is an IMS server.

29. The system of claim 25, wherein the multimedia portal contents are implemented with at least one of an Internet web page, a still image, a motion image, a Wireless Application Protocol (WAP) and audio.

30. The system of claim 25, wherein the first server includes information about multimedia portal contents to be provided in a header and body of a Session Initiation Protocol (SIP) message.

31. The system of claim 25, wherein the priority decision criterion is that the first multimedia portal contents set by the calling terminal have a higher priority than the second multimedia portal contents set by the called terminal.

32. The system of claim 25, wherein the priority decision criterion is that the second multimedia portal contents set by the called terminal have a higher priority than the first multimedia portal contents set by the calling terminal.

33. The system of claim 25, wherein the first server configures an additional menu so that the calling terminal can perform an additional function using the multimedia portal contents when the multimedia portal contents to be provided to the calling terminal are constructed.

34. The system of claim 33, wherein the additional menu is for providing capability information in response to a query about capability of a terminal and a service of a subscriber.

35. A method for providing a called terminal with a ringtone in a communication system, comprising the steps of:
presetting first multimedia portal contents when a calling terminal desires to provide the first multimedia portal contents as a bell, and making a call connection setup request;
presetting, by a called terminal, second multimedia portal contents to the ringtone to receive the second multimedia portal contents as the bell; and
receiving and reproducing the first or second multimedia portal contents as the bell from a particular server according to a predefined priority decision criterion whenever the call connection setup request is received.

36. The method of claim 35, wherein the multimedia portal contents are implemented with at least one of an Internet web page, a still image, a motion image, a Wireless Application Protocol (WAP) and audio.

37. The method of claim 35, wherein information about the multimedia portal contents is included in a header and body of a Session Initiation Protocol (SIP) message.

38. The method of claim 35, wherein the priority decision criterion is that the first multimedia portal contents set by the calling terminal have a higher priority than the second multimedia portal contents set by the called terminal.

39. The method of claim 35, wherein the priority decision criterion is that the second multimedia portal contents set by the called terminal have a higher priority than the first multimedia portal contents set by the calling terminal.

40. The method of claim 35, further comprising:
configuring an additional menu so that the calling terminal can perform an additional function using the multimedia portal contents when the multimedia portal contents to be provided to the calling or called terminal are constructed.

41. The method of claim 40, wherein the additional menu is for providing capability information in response to a query about capability of a terminal and a service of a subscriber.

42. The method of claim 35, wherein the particular server is a Personal Internet Protocol Multimedia Subsystem (IMS) Portal (PIP) server for providing the calling and called terminals with the first or second multimedia portal contents.

* * * * *